(12) United States Patent
Ernst De La Graete

(10) Patent No.: US 10,751,774 B2
(45) Date of Patent: Aug. 25, 2020

(54) SHEARING DEVICE

(71) Applicant: FIVES DMS, Noyelles-les-Seclin (FR)

(72) Inventor: Conrad Ernst De La Graete, Noyelles-les-Seclin (FR)

(73) Assignee: FIVES DMS, Noyelles-les-Seclin (FR)

( * ) Notice: Subject to any disclaimer, the term of this patent is extended or adjusted under 35 U.S.C. 154(b) by 631 days.

(21) Appl. No.: 15/323,535

(22) PCT Filed: Jun. 18, 2015

(86) PCT No.: PCT/FR2015/051619
§ 371 (c)(1),
(2) Date: Jan. 3, 2017

(87) PCT Pub. No.: WO2016/001505
PCT Pub. Date: Jan. 7, 2016

(65) Prior Publication Data
US 2017/0157618 A1  Jun. 8, 2017

(30) Foreign Application Priority Data

Jul. 3, 2014  (FR) ..................................... 14 56406

(51) Int. Cl.
*B23D 25/12* (2006.01)
*B21B 1/38* (2006.01)
*B26D 1/62* (2006.01)

(52) U.S. Cl.
CPC ................ *B21B 1/38* (2013.01); *B23D 25/12* (2013.01); *B26D 1/626* (2013.01)

(58) Field of Classification Search
CPC ......... B23D 25/14; B23D 25/12; B26D 1/626
(Continued)

(56) References Cited

U.S. PATENT DOCUMENTS 2,020,996 A * 11/1935 Crafts .................. B26D 1/0006
                                                83/110
2,246,957 A *  6/1941 Shields ................ B26D 1/0006
                                                83/341
(Continued)

FOREIGN PATENT DOCUMENTS

BE        490 046 A     7/1949
DE      1117358 A       9/1957
(Continued)

OTHER PUBLICATIONS

International Search Report, dated Jul. 29, 2015, from corresponding PCT application.
(Continued)

*Primary Examiner* — Kenneth E Peterson
(74) *Attorney, Agent, or Firm* — Young & Thompson

(57) ABSTRACT

A shearing device for fragmenting a metal strip includes two counter-rotating drums facing one another, a drive device connecting the drums and synchronising their rotation speed, and at least one pair of drum-supported blades. The blades engage by shearing effect during drum rotation to cut the waste. The blades of the pair have, from the cutting edge thereof, planar surfaces, referred to as overlapping surfaces, overlapping and facing one another during the shearing between blades, each blade being secured transversely to the drum, at an angle to the axis of rotation of the drum, so the plane through the overlapping surface of the blade forms an angle with the axis of rotation of the corresponding drum, producing gradual shearing. The overlapping surface of each blade is tilted so the plane passing through the overlapping surface does not intersect the rotational axis of the drum on its active width.

15 Claims, 5 Drawing Sheets

(58) Field of Classification Search
USPC .................................................. 83/342, 672
See application file for complete search history.

(56) References Cited

U.S. PATENT DOCUMENTS

| | | | |
|---|---|---|---|
| 2,417,556 A | | 3/1947 | Kramer |
| 2,568,333 A | * | 9/1951 | Erhard Henschker ..................... B23D 25/12 83/341 |
| 3,030,841 A | * | 4/1962 | Haas .................... B26D 7/2614 83/672 |
| 3,084,582 A | * | 4/1963 | Anderson ............... B26D 1/626 83/341 |
| 3,247,746 A | * | 4/1966 | Daniel Nystrand Ernst ................ B26D 1/0006 83/342 |
| 3,570,348 A | * | 3/1971 | Hallden ................. B23D 25/12 83/342 |
| 3,570,363 A | * | 3/1971 | Thomas ................. B23D 25/12 83/37 |
| 3,606,813 A | * | 9/1971 | Name Not Available ................... B23D 25/12 83/672 |
| 3,799,020 A | | 3/1974 | Hoelmer |
| 4,004,479 A | | 1/1977 | Bodnar |
| 4,034,637 A | | 7/1977 | Ollery |
| 4,073,428 A | | 2/1978 | Wahlbeck |
| 4,630,514 A | * | 12/1986 | Ohmori ................ B23D 35/001 83/341 |
| 4,784,032 A | * | 11/1988 | Leeuwestein .......... B23D 25/12 83/345 |
| 4,858,506 A | | 8/1989 | Buta |
| 5,117,718 A | * | 6/1992 | Wittkopf ................ B26D 1/626 83/342 |
| 6,422,113 B1 | * | 7/2002 | Blume .................... B23P 15/40 83/342 |

FOREIGN PATENT DOCUMENTS

| | | |
|---|---|---|
| EP | 0 596 673 A1 | 5/1994 |
| FR | 2 306 773 A1 | 11/1976 |
| FR | 2 306 776 A | 11/1976 |
| FR | 2 640 174 A1 | 6/1990 |
| WO | 2013/088531 A1 | 6/2013 |

OTHER PUBLICATIONS

Office Action issued in Indian Patent Application No. 201617045146 dated May 26, 2020.

* cited by examiner

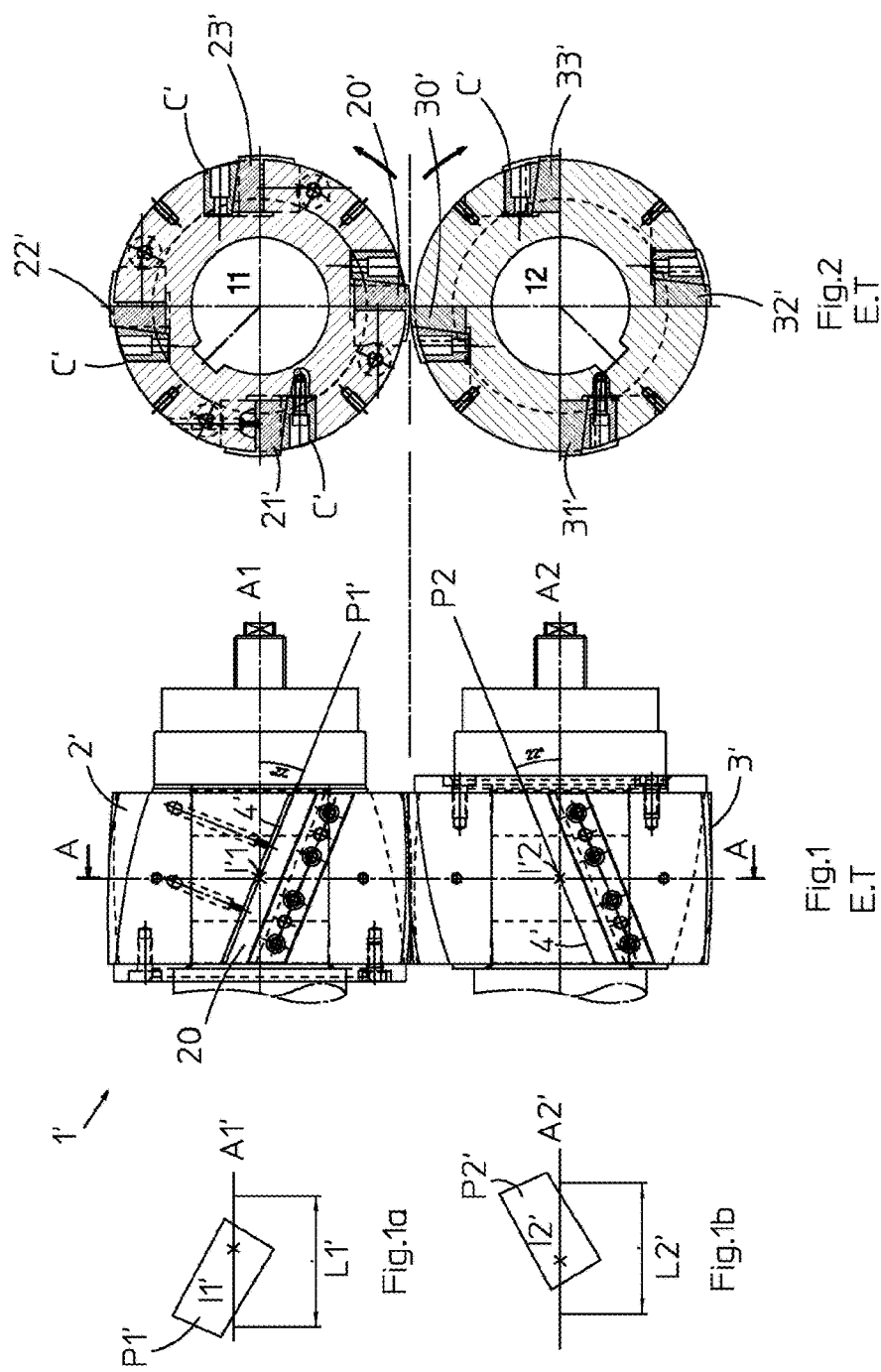

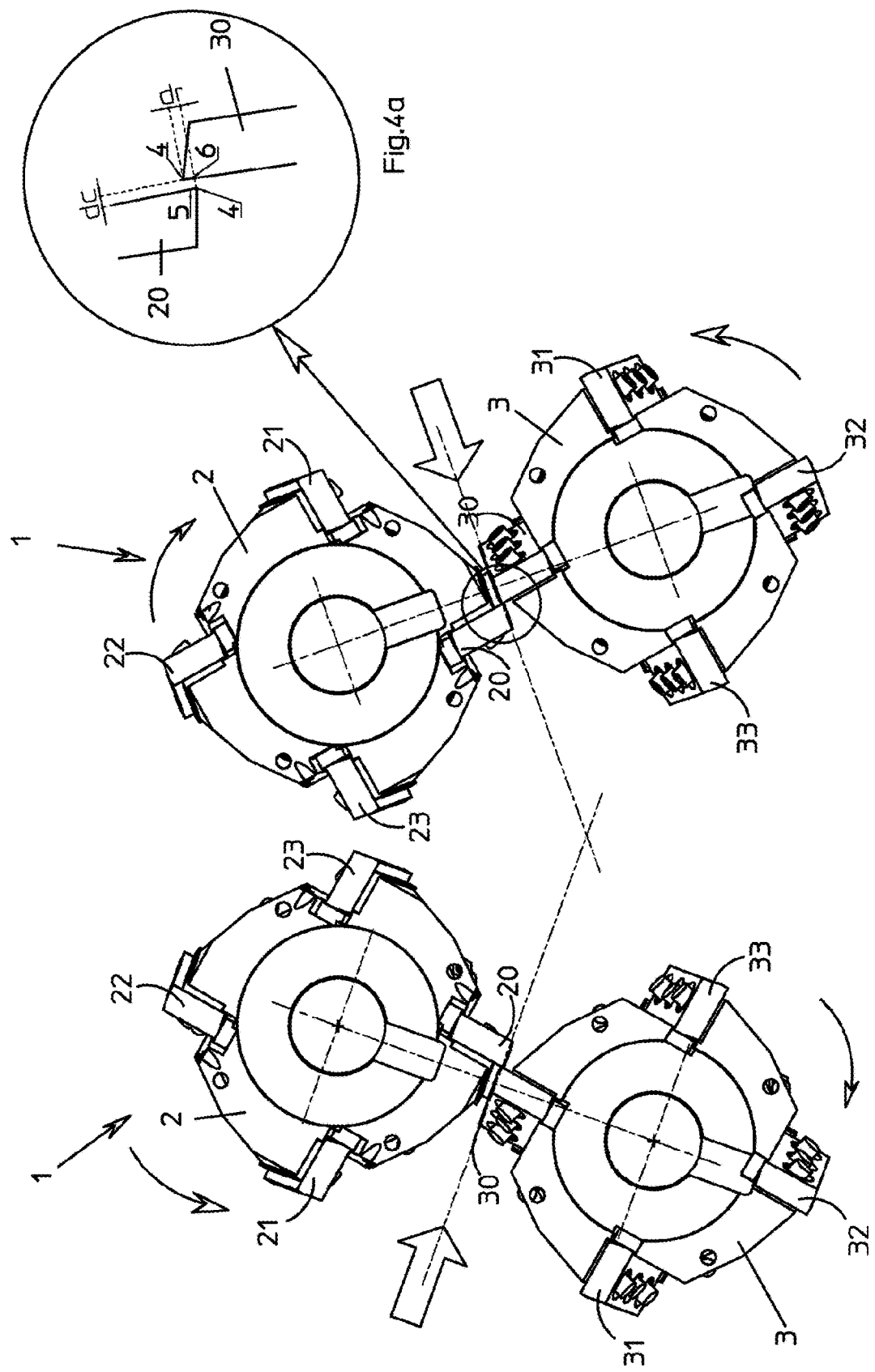

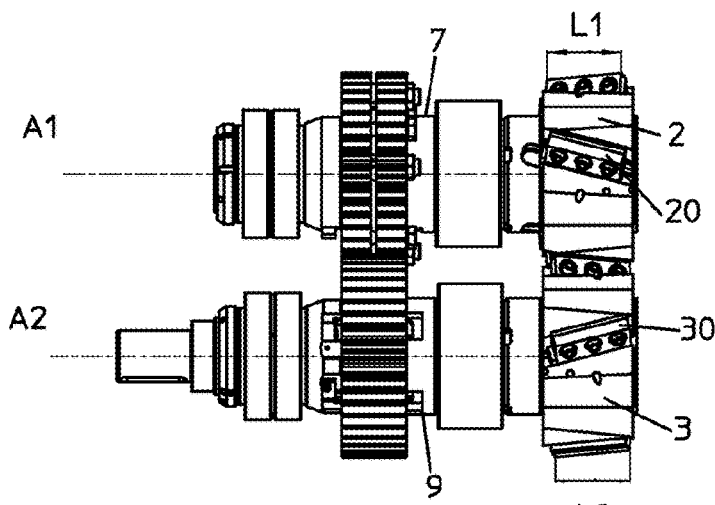
Fig.5
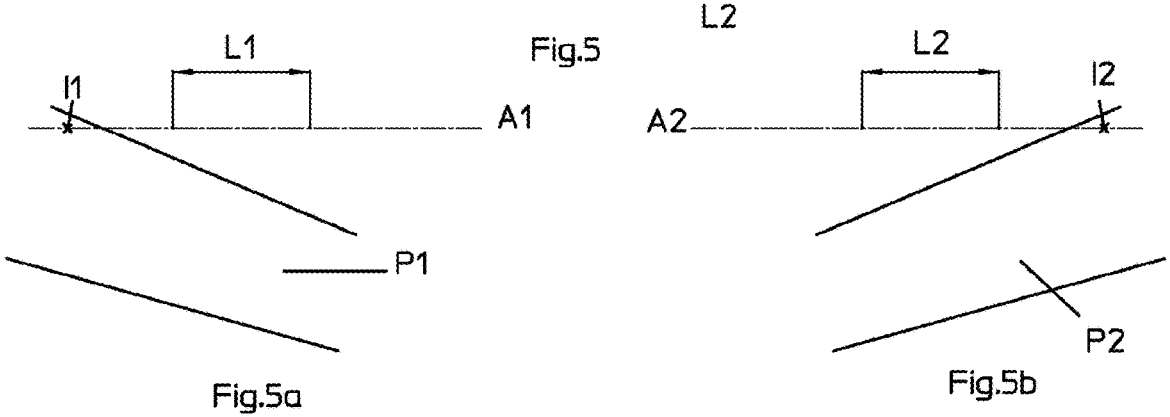
Fig.5a  Fig.5b
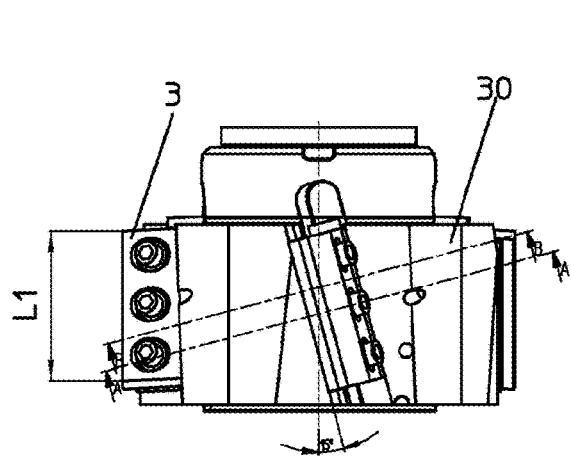
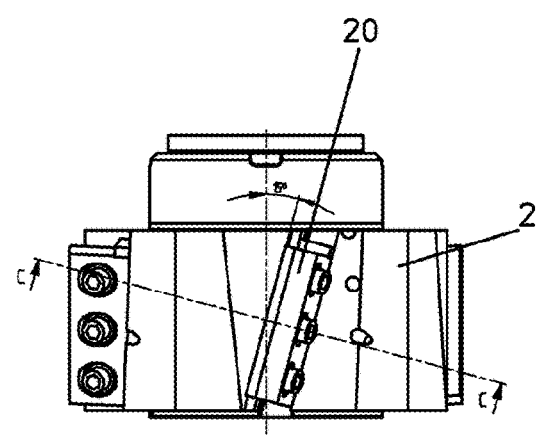
Fig.6  Fig.7

SHEARING DEVICE

The invention relates to a shearing device intended for fragmenting waste, and more specifically a metal strip, into multiple pieces.

BACKGROUND OF THE INVENTION

The field of the invention is, in lines for processing metal strips (for example rolling mills), that of rotary shearing devices used to fragment edge scrap into multiple pieces.

During operations of processing a metal strip, it is known to cut the edges of the metal strip in order to get the strip to the desired width. This operation is conventionally carried out via pairs of cutting discs that cut the strip during the travel of said strip, near the edges, in the direction in which the strip moves forward.

The strip, cut to size, continues moving forward on the processing line, while each section of strip cut off, called "edge scrap", is diverted and guided out of the line. Document U.S. Pat. No. 2,417,556 teaches such a cutting device having discs.

This strip is waste that can be wound onto a mandrel or compacted when too much strip accumulates.

Another solution is to fragment this continuous waste into multiple pieces during the travel of said waste, via a rotary shearing device.

A person skilled in the art thus knows numerous rotary shearing devices for fragmenting edge scrap.

For example, document U.S. Pat. No. 3,799,020 discloses a shearing device comprising a drum provided on the circumference with a plurality of blades and with a stationary counter-blade intended to successively cooperate in the shearing with the blades of the drum during the rotation of said drum. FIG. 1 of this prior art illustrates the edge scrap that is diverted from the line and fragmented continuously between the blades of the drum, which rotates, and the counter-blade, which is stationary.

The invention relates, however, more particularly to the shearing device having two counter-rotating drums.

In this type of shearing device, as taught by document U.S. Pat. No. 4,004,479, two counter-rotating drums are positioned facing each other, a drive device connecting the drums and controlling the speed of rotation of said drums. The drums are provided with blades (or "knives") positioned in pairs, respectively. The blades of each of the drums are arranged, transversely to the drum, in order to work in shearing in pairs and fragment the strip while the strip is driven between the drums.

In order to obtain a good cut, the rotations of the drums must be precisely synchronised, which allows the cutting clearance, in particular circumferential, between the blades of the pair to be controlled during shearing. For this purpose and as taught by document U.S. Pat. No. 4,004,479, it is known to synchronise the rotations of the drums via gears without any play ("anti-backlash gears") linking the rotation of the shafts of the drums.

The cutting clearance between the blades of the same pair during the shearing is conventionally determined on the basis of the thickness of the strip to be cut. The thinner the strip, the more this cutting clearance must be reduced. In practice, a person skilled in the art respects the rule of $\frac{1}{10}$, namely that the cutting clearance between blades is determined as $\frac{1}{10}$ of the strip thickness to be cut.

In the shearing device having counter-rotating drums taught by document U.S. Pat. No. 4,004,479, the blades are substantially parallelepiped-shaped bars regularly distributed on the circumference of the drum and each oriented transversely to the drum. The cutting edges of the blades are rectilinear and substantially parallel to the axis of rotation of the drum.

Such a device, however, is not totally satisfactory because said device causes impacts and not progressive cutting of the edge scrap.

In order to obtain progressive cutting of the edge scrap, and thus substantially limit the noise of the cutting, a person skilled in the art knows, for example from document DE1117358, to orient the blades at an angle with respect to the axis of rotation of the drum. In other words, the longitudinal direction of each blade (and of the cutting edge thereof) is no longer parallel to the axis of the drum but inclined with respect to said axis. Moreover, the blades belonging to the two drums have opposite diagonal orientations. Thus, the shearing begins locally at the two longitudinal ends of the blades of the pair and moves along the blades up to the two opposite longitudinal ends, which allows the noise of cutting to be reduced quite substantially.

Moreover, a person skilled in the art knows that the cutting diameter (namely, double the distance between the cutting edge of each blade and the axis of rotation of the drum) can only be, in the devices of the prior art, very slightly greater than the centre-to-centre distance between the two drums, otherwise, during the rotation of the drums, contacts between the cutting edges of the blades and the overlapping faces of said blades may occur, causing premature wear to the cutting edges of the blades.

When the cutting diameter is greater than the centre-to-centre distance by too much, given the cutting clearance that must be respected, there is too much overlapping between the blades (of the same pair) to avoid having these blades impact each other during the shearing.

When the blades are inclined with respect to the axis of the drum, in such a way as to obtain progressive cutting, as taught by document DE 1117358, it is therefore, according to the known prior art, necessary to machine the cutting edge in a curved way in such a way that, as much as possible, the radius separating the axis of the drum and the cutting edge be constant over the length of this cutting edge. It is no longer possible to have a rectilinear cutting edge in that this cutting edge would be, at the longitudinal ends of the blade, locally, at a radius much greater than the radius of the cutting edge, locally, in the median zone of the blade. At these longitudinal ends, there would therefore be too much overlapping between the blades of the drums to avoid interference between the cutting edges of these rectilinear blades and the overlapping faces of the opposite blades.

Conventionally, such curved machining of the cutting edge of the blades is carried out using blades that are substantially parallelepiped-shaped, previously mounted on each of the drums, which are necessarily removable drums that can be dissociated from the respective rotating shafts thereof in order to allow the curved machining operation to be carried out.

The parallelepiped-shaped blades/drum assembly is then removed from the shearing device and positioned on a machining station. On this machining station, the cutting edges of the blades are reground in a curved manner. Once this machining work is finished, the drum is removed from the machining station in order to be mounted on the rotating shaft of the shearing device.

As the blades wear, it is possible to use wedges between the blades and the drum in order to make the blades of the drum stick out more and to carry out a new regrinding of the blades, along a curved trajectory, according to the aforementioned machining procedure.

Such prior art conventionally requires having an additional set of drums in order to allow the regrinding of the blades, with the goal of not having to stop the rolling mill for too long during these maintenance periods.

An intrinsic disadvantage of such a device is caused by the removable nature of the drums with respect to the respective shafts thereof. It is not rare to note a defect in the positioning of the drum on the shaft of said drum, which inevitably leads to errors in the cutting clearances and thus to cutting defects.

From document FR 2 640 174, a shearing device having two counter-rotating drums is again known. Like the previous document, the blades are not parallel to the axis of rotation of the drum, but at an angle with respect to said axis, in such a way as to produce progressive shearing of the waste.

Unlike the previous document, the device of document FR 2 640 174 involves the use of curved blades machined along a predetermined radius of curvature before said blades are mounted on the drum of said blades.

Each blade is characterised by convex outer faces and flat lateral faces, and four (curved) cutting edges formed at the intersections between the lateral faces and the two convex outer faces. When one of the cutting edges is worn, the blade is removed from the drum and remounted in a different position in order to expose one of the other cutting edges.

The prior art of shearing devices having counter-rotating drums and progressive cutting, taught in particular by document FR 2 640 174 or DE 1117358, are, to the knowledge of the applicant, exclusively reserved for fragmenting scrap from products having large thicknesses, typically greater than 1 mm, and having high yield strengths, typically greater than 300 MPa.

This is explained by the fact that, in these devices of the prior art, the cutting diameter (namely, double the distance between the cutting edge of each blade and the axis of rotation of the drum) can only be very slightly greater than the centre-to-centre distance between the two drums, otherwise, premature wear of the cutting edges may occur.

This size constraint implies little overlapping between the blades in order to prevent the blades from impacting each other during the shearing.

For products having large thicknesses and high yield strengths, such devices allow cutting via brittle fracturing of the product, without there being any overlapping of the blades and thus without the risk of impact between the blades, even with a small cutting clearance.

However, it is known that such devices are not suitable for thinner products, namely less than 0.3 mm, and/or soft products, which have significant coefficient of elongation at rupture products (>20%), in that these products are inserted into the clearance between blades without brittle fracturing of the product taking place, the overlapping thus being insufficient to allow the product to be cut via tearing.

Moreover, and for certain devices of the type in document DE1117358, the blades are mounted on the respective drum thereof via radial screws and wedges. The clamping of these wedges via screwing must be progressive and precise, conventionally via a predetermined procedure, otherwise the removable drum may be ovalised, such an ovalisation modifying the cutting clearance and leading to cutting defects.

In the prior art of shearing machines having counter-rotating drums, a shearing machine, the two blades of which, carried by the drums, respectively, have rectilinear cutting edges, is also known from document BE 490 046, dating to 1949. In this document, the rectilinear cutting edge (called cutting edge) of each blade has an axis strictly parallel to the axis of rotation of the corresponding drum, which carries the blade. This document teaches inclining the blades with respect to the radial plane passing through the cutting edge in order to allow clean shearing. Thus, and as illustrated in FIG. 3 of document BE 490 046, for each drum, the plane passing through the overlapping face of the blade never intersects the axis of rotation of the corresponding drum.

In FIG. 4, this document also teaches reducing the impacts during the shearing by inclining the axis of rotation O1-O1 of the first drum with respect to the axis of rotation O2-O2 of the second drum, while the rectilinear cutting edge (called cutting edge) of each blade conserves an axis strictly parallel to the axis of rotation of the corresponding drum, which carries the blade. According to the observations of the inventors, such an inclination between the axes of rotation of the two drums, with the goal of reducing impacts, can only be very slight and does not allow progressive shearing to be obtained as taught by document DE1117358, when the blades of the pair are each inclined by an angle with respect to the axis of rotation of the corresponding drum thereof, the blades of the pair carried by the two drums having opposite diagonal orientations. According to the observations of the inventor, such a shearing machine according to this prior art document BE490046 does not allow fractioning at a high speed, and contrary to the shearing machines of prior art documents DE1117358 and FR 2640174.

A shearing machine having counter-rotating drums and in which the blades of the pair, carried by the two drums, have a rectilinear cutting edge (called cutting edges, labelled 1 and 2) is also known from document FR 2306773. According to the description of this prior art document, the axes of rotation of the drums labelled "xx" and "yy" are parallel to each other.

According to this prior art document, each of the cutting edges, labelled 1 or 2, is contained in a plane, labelled 3 or 4, that passes through the axis of rotation of the drum xx or yy. Moreover, the edges are inclined by the same angle with respect to the shared direction of the axes of rotation of the drums, with the goal of obtaining a progressive cut.

Here again, and according to the observations of the inventor, such a blade inclination along an axis of rotation perpendicular to the radial plane can only be very minimal in comparison to the inclination of the blades as taught by document DE 1117358 or FR 2640174, in which the blades carried by the drums have opposite diagonal orientations. A shearing machine as taught by document FR 2306773 does not allow the progressive cutting of the shearing machines of documents DE 1117358 and FR 2640174 to be obtained. In document DE 1117358 or FR 2640174, the inclination that allows the progressive cutting is obtained substantially via a rotation of the blade about an axis of rotation substantially radial and perpendicular to the axis of rotation, while in document FR 2306773, the inclination is obtained by a rotation of the blade about an axis of rotation perpendicular to the radial plane.

When the blades are inclined according to the teaching of document DE1117358, the rectilinear edge or cutting edge of the blades and the axis of rotation of the drum are not coplanar: the edge cannot be contained in a plane passing through the axis of rotation of the drum as taught by document FR2306773. According to the observations of the inventor, and like the previous document, such a shearing machine according to this prior art document FR2306773 does not allow fractioning at a high speed, and contrary to the shearing machines of prior art documents DE1117358 and FR 2640174.

SUMMARY OF THE INVENTION

The goal of the present invention is to overcome all or part of the aforementioned disadvantages by proposing a new shearing device having counter-rotating drums and progressive cutting.

Another goal of the present invention is to propose such a shearing device suitable for fragmenting a metal strip at a high speed.

More specifically, one of the goals of the present invention is to propose, at least according to one embodiment, such a shearing device having counter-rotating drums and progressive cutting that allows thin and/or soft products to be fragmented, in particular products having a thickness of less than 1 mm or even less than 0.3 mm and/or having a significant elongation coefficient, in particular greater than 20%.

Another goal of the present invention is to propose, at least according to one embodiment, such a device having counter-rotating drums that does not require specific and precise machining of the blade cutting edges, more specifically according to a specific curved trajectory.

Another goal of the present invention is to propose, at least according to one embodiment, such a device having counter-rotating drums, the drums of which are not very liable to be ovalised during the clamping of the blades onto the drum of said blades.

Other goals of the present invention will appear in the following description, which is only given as a non-limiting example.

Thus, the invention relates first of all to a shearing device, intended to fragment waste, in particular fragment a metal strip into multiple pieces, said device comprising two counter-rotating drums positioned facing each other, the axes of rotation of the drums being parallel to each other, a drive device connecting the drums and synchronising the speed of rotation of said drums, and at least one pair of blades, the blades of the pair being carried by the two drums, respectively, the blades of the pair being intended to cooperate via a shearing effect during the rotation of the drums in order to cut the waste, the blades of the pair having, starting from the cutting edge of said blades, flat faces, called overlapping faces, that overlap with each other and face each other at least locally during the shearing between blades, each blade being attached transversely to the drum, at an angle with respect to the axis of rotation of the drum, the blades of the pair carried by the two drums having opposite diagonal orientations, and in such a way that the plane passing through said overlapping face of the blade forms an angle with the axis of rotation of the corresponding drum and in such a way as to produce progressive shearing.

According to the invention, said overlapping face of each blade is (doubly) inclined with respect to the drum in such a way that the plane passing through said overlapping face does not intersect the axis of rotation of the drum over the active width of the drum.

Here, the "double" inclination of each blade is understood with respect to the prior art of document U.S. Pat. No. 4,004,479, which discloses rectilinear blade cutting edges substantially parallel to the axis of rotation of the drum.

As illustrated in FIG. 3 of this prior art document, the plane of the overlapping face of the active cutting edge of each blade passes substantially through the axis of rotation of the corresponding drum or a parallel plane adjacent to said axis.

Thus, and with respect to this teaching of document U.S. Pat. No. 4,004,479, a first inclination of the overlapping face is obtained by rotation of the blade about an axis of rotation that passes through the overlapping face, is substantially radial, and is perpendicular to the axis of rotation of the drum.

In other words, once inclined according to a first inclination, the axis of rotation of the drum and the blade cutting edge are not coplanar and cannot therefore be contained in the same plane, as is visible in FIGS. 5, 6 and 7 and contrary to the teaching of document FR 2306776, in which the blade cutting edge is always contained in a plane passing through the axis of rotation of the drum carrying the blade when the blade is inclined with respect to the axis of rotation of the drum.

This "first" inclination ensures, according to the prior art known from prior art documents FR 2 640 174 and DE 1117358, progressive shearing of the product. However, this first inclination alone is not sufficient to overcome the problems identified in the description for these prior art documents; in particular, and for this prior art:

it is still necessary to machine the cutting edges in a curved manner, these devices are not suitable for thinner products, in particular less than 0.3 mm, and/or soft products, which have significant coefficient of elongation at rupture products (>20%).

It should be noted that in the devices of the prior art known from these prior art documents FR 2 640 174 and DE 1117358, the blade is always positioned on the drum in such a way that the plane passing through the overlapping face of the active cutting edge of the blade intersects the axis of the corresponding drum at a point positioned on the segment of the axis corresponding to the active width of the drum, often close to the middle of the segment.

The invention differs from this prior art by a "second" inclination, obtained by a rotation of the blade about an axis of rotation that passes through the overlapping face and is substantially parallel to the blade cutting edge.

As a non-limiting example:

the first rotation can be of 15° (+/−5°) and the second rotation can be of 9.5° (+/−5°).

The inclinations of the blades of the same pair are such that the overlapping faces of the pair are substantially parallel when the blades work in shearing.

This second inclination allows said overlapping face of each blade to be inclined with respect to the drum in such a way that the plane passing through said overlapping face does not intersect the axis of rotation of the drum over the active width of the drum. According to the observations of the inventor, this second inclination allows the defects identified above to be eliminated.

According to the observations of the inventors, such a double inclination of the blades with respect to the drum allows greater overlapping (namely greater overlapping of the overlapping faces between blades during shearing) and/or allows having a smaller cutting clearance between blades in comparison to the shearing device of the prior art, without the risk of interference between the cutting edges of the blades and the opposite overlapping faces during rotation.

Obtaining greater overlapping between blades allows the strips to be stretched more and thus allows strips having a high elongation coefficient to be cut via tearing.

Reducing the cutting clearance allows thinner strips to be cut, a good cut being generally obtained by determining the cutting clearance as 1/10 of the thickness of the strip to be cut.

Thus, such a device has a particular use in fragmenting edge scrap having a thickness of less than 1 mm, or even less than 0.3 mm, and/or made from a material having an elongation coefficient greater than 20%.

Such a double inclination of the blades optionally and advantageously allows the use of blades having a rectilinear cutting edge to be used, without the risk of the blades impacting each other.

Also and preferably, the blades of the pair each have a constant cross-section longitudinally, each having a rectilinear cutting edge defined at the intersection of the overlapping face and an outer face of the blade.

According to one embodiment, the blades of a pair are positioned on the drum thereof in such a way as to allow overlapping of said overlapping faces of the blades, during shearing, greater than 0.33% of the cutting centre-to-centre distance, for a cutting clearance between blades of less than 0.02 mm.

According to one embodiment, the blade has at least one flat lateral face suitable for forming said overlapping face at least over a surface portion, said rectilinear cutting edge being defined at the intersection of the flat lateral face and a flat upper outer face.

According to one embodiment, each blade of the pair is a reversible blade having two mounting positions on the drum, said blade having two lateral faces, parallel and opposite, suitable for each forming, at least over a surface portion, said overlapping face, a first rectilinear cutting edge being defined at the intersection of one of the lateral faces and an upper outer face, and a second rectilinear cutting edge being defined at the intersection of the other lateral face and another lower outer face.

According to one embodiment, each blade is fastened to the drum at a housing of said drum comprising a flat bearing face for said lateral face carrying the active cutting edge, directly or via a wedge.

According to one embodiment, the housing comprises, besides the flat bearing face, called first bearing face for said lateral face of said blade carrying the active cutting edge, a second bearing face substantially perpendicular to the first bearing face and acting as a support for a lower outer face of said blade, directly or via a wedge.

According to one embodiment, each blade has a plurality of bores for attachment screws to pass through, said attachment screws cooperating with threaded bores extending from the flat face acting as a support for said lateral face.

According to one embodiment, said drive device connecting the drums and synchronising the speed of rotation of said drums comprises two rotating shafts rigidly connected to the two drums, respectively, and a gear connecting the shafts, comprising a first toothed wheel and a second toothed wheel.

Preferably, each drum and the corresponding rotating shaft thereof consist of a single-piece metal element. The defects relating to the positioning of the drum on the shaft, as encountered in the shearing devices having removable drums, are thus eliminated.

BRIEF DESCRIPTION OF THE DRAWINGS

The invention will be better understood after reading the following description, accompanied by the appended drawings, in which:

FIG. 1 is a front view of the drums of a shearing device as known from the prior art, FIG. 1a schematically shows the intersection, at the point I1', of the plane P1' passing through the overlapping face of FIG. 1 with the axis A1' of rotation of the upper drum, this point I1' being located on the segment of the axis A1 corresponding to the width L1' of the drum and, in general, close to the middle of the segment as known from the prior art, FIG. 1b schematically shows the intersection, at the point I2', of the plane P2' passing through the overlapping face of FIG. 1 with the axis A2' of rotation of the lower drum, this point I2' being located on the segment of the axis A2 corresponding to the width L2' of the drum and, in general, close to the middle of the segment as known from the prior art, FIG. 2 is a view of the cross-section A-A of FIG. 1, FIG. 2a is a detailed view showing the overlapping between the blades of the device of FIG. 2, FIGS. 3 and 4 are right-hand and left-hand views of the counter-rotating drums of a device according to the invention, FIG. 4a is a detailed view showing the overlapping between blades and the cutting clearance, FIG. 5 is a view of the two drums of the device according to the invention, the rotating shafts of said drums, and the anti-backlash gears synchronising the opposite rotations of the shafts, FIG. 5a schematically shows the intersection, at the point I1, of the plane P1 passing through the overlapping face of a blade of the upper drum of FIG. 5 with the axis A1 of rotation of the upper drum, this point I1 being located outside of the segment of the axis A1 corresponding to the width L1 of the drum via the doubly inclined position of the blade on the drum, FIG. 5b schematically shows the intersection, at the point I2, of the plane P2 passing through the overlapping face of a blade of the lower drum of FIG. 5 with the axis A2 of rotation of the lower drum, this point I2 being located outside of the segment of the axis A2 corresponding to the width L2 of the drum via the doubly inclined position of the blade on the drum, FIGS. 6 and 7 are respective views of the two drums, lower and upper.

DETAILED DESCRIPTION OF THE PREFERRED EMBODIMENTS

Figure 8A:
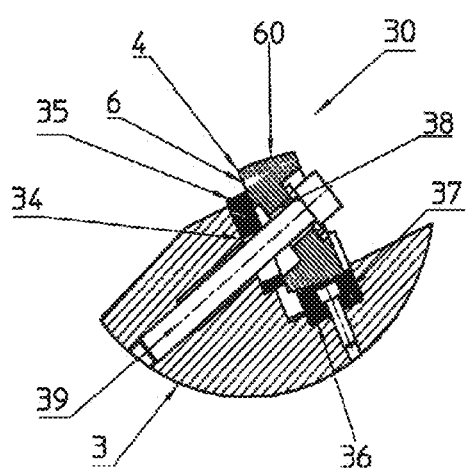
FIG. 8a and FIG. 8b are views of the cross-section A-A of FIG. 6, for a new blade and a worn blade, respectively.

A shearing device having counter-rotating drums according to the prior art, known to the applicant, is illustrated in FIGS. 1 and 2, This is a shearing device 1' intended to fragment waste, in particular fragment a metal strip, such as edge scrap, into multiple pieces. This device 1' comprises two counter-rotating drums 2',3' positioned facing each other, the axes of rotation of the drums being substantially parallel.

A drive device (not shown) connects the drums and synchronising the speed of rotation of said drums.

This device 1' comprises at least one pair of blades 20' 30'; 21' 31'; 22' 32'; 23', 33' (and more particularly four pairs of blades), the blades 20', 30'; 21', 31'; 22', 32'; 23', 33' of the pair being carried by the two drums 2',3', respectively, the blades of the pair being intended to cooperate via a shearing effect during the rotation of the drums 2',3' in order to cut the waste.

As illustrated in FIG. 2a, the blades of the pair have, starting from the cutting edge 4' of said blades, flat faces 5',6', called overlapping faces, that overlap with each other and face each other at least locally during the shearing between blades 20', 30'; 21', 31'; 22', 32'; 23', 33'.

As illustrated in FIG. 1, each blade is attached transversely to the drum 2';3', at an angle with respect to the axis of rotation A1' (or A2') of the drum 2';3', and in such a way that the plane P1' (or P2') passing through said overlapping face 5',6' of the blade forms an angle with the axis of rotation A1;A2 of the corresponding drum in such a way as to produce progressive shearing.

Moreover, the blades of the pair carried by the two drums 2' and 3' have opposite diagonal orientations.

Thus, the shearing begins locally at the two longitudinal ends of the blades of the pair and moves along the blades up to the two opposite longitudinal ends, which allows the noise of cutting to be reduced quite substantially.

According to the observations of the present applicant, such a prior art has the disadvantages mentioned in the introduction.

The cutting diameter (namely, double the distance between the cutting edge 4' of each blade and the axis of rotation of the corresponding drum A1' or A2') can only be, in these devices of the prior art, very slightly greater than the centre-to-centre distance (distance between the axis A1' and the axis A2') between the two drums, otherwise premature wear of the cutting edges may occur. In such a device of the prior art, the cutting diameter is at most 0.13% greater than the cutting centre-to-centre distance, with a clearance of 0.05 mm.

In this type of device, this size constraint means little overlapping between the blades in order to prevent the blades from impacting each other during the shearing.

This overlapping is illustrated in FIG. 2a by the dimension "dr'". For products having large thicknesses and high yield strengths, such devices allow cutting via fracturing of the product, without the overlapping and the cutting clearance being crucial to the cutting.

However, it is known that such devices are not suitable for thinner products, namely less than 0.3 mm, and/or soft products, which have significant coefficient of elongation at rupture products (>20%), in that these products are inserted into the clearance between blades, the overlapping thus being insufficient to allow the product to be cut via tearing.

It should be noted that in the devices of the prior art, and as illustrated in FIG. 1, the blade is always positioned on the drum in such a way that the plane P1' (respectively P2') passing through the overlapping face 5' (respectively 6') of the blade intersects the axis of the corresponding drum A1' (or A2') at a point I1' (respectively I2') positioned on the segment of the axis corresponding to the active width of the drum L1' (or L2').

Here, active width means the width of the drum over which the cutting takes place.

Thus, and as illustrated in FIG. 1a, the plane P1' passing through the overlapping face 5' of the blade 20' intersects the axis A1' at a point I1'. This point I1' is positioned on the segment of the axis corresponding to the width L1' of the drum 2'.

Likewise, and as illustrated in FIG. 1b, the plane P2' passing through the overlapping face 6' intersects the axis A2' at a point I2'. This point I2' is positioned on the segment of the axis corresponding to the width L2' of the drum 3'.

Thus, and according to the known prior art, the inclination of the blades on the drum of said blades is such that the point of intersection I1' (or I2') is always positioned on the segment of the axis A1' (or A2') corresponding to the active width of the corresponding drum L1' (or L2').

Such a device according to the prior art requires machining the cutting edges of the blades along curved trajectories. The prior art illustrated in FIG. 1 and in FIG. 2 has removable drums. The machining of the cutting edges of the blades is carried out on the removable drum of said blades, on specific machining stations.

The clamping of the blades in the housings of drums is carried out via wedges C', which lead to an ovalisation of the drums when the clamping procedure is not respected.

The invention is the result of the observation of the inventors that it is possible, in such shearing devices, to substantially improve the kinematics of the shearing of the blades and in particular increase the overlapping between the blades by substantially modifying the inclination of the blades with respect to the corresponding drum of said blades, and more particularly the inclination of the overlapping faces of the blades with respect to the drum, with the goal of preventing the blades of the drums from interfering with each other.

Such a configuration according to the invention allows greater overlapping (distance "dr" in FIG. 4a) during the cutting in comparison to the shearing devices of the known prior art, which promotes the cutting of the waste via tearing and thus the cutting of "soft" product.

Alternatively, or in addition, this configuration allows the cutting clearance (distance "dc") to be reduced in comparison to the shearing devices of the known prior art, which allows thinner waste to be cut.

Such an inclination of the blades is characterised, according to the invention, in that said overlapping face 5;6 of each blade 20; 30; 21; 31; 22, 32; 23;33 is doubly inclined with respect to the corresponding drum 2;3 in such a way that the plane P1 (or P2) passing through said overlapping face 5 (or 6) does not intersect the axis of rotation of the drum 2 (or 3) over the active width L1 (or L2) of the corresponding drum 2 (or 3).

Thus, as illustrated in FIG. 5a, according to the invention, the plane P1 intersects the axis A1 at the point I1, which is located outside of the segment of the axis A1 corresponding to the active width L1 of the upper drum.

Likewise, and as illustrated in FIG. 5b, according to the invention, the plane P2 intersects the axis A2 at a point I2, outside of the segment of the axis A2 corresponding to the active width L2 of the lower drum.

Thus, the invention relates to a shearing device 1 intended to fragment waste, in particular fragment a metal strip into multiple pieces.

This device comprises two counter-rotating drums 2,3 positioned facing each other, the axes of rotation A1 and A2 of the drums being substantially parallel. A drive device connects the drums and synchronises the speed of rotation of said drums. This device can comprise two rotating shafts 8,9 rigidly connected to the two drums 2,3, respectively, as well as a gear comprising a first toothed wheel 90 and at least one second toothed wheel 80,81.

The first toothed wheel 90 is mounted on the shaft 9 and said at least one second toothed wheel 80,81 mounted on the other shaft 8 meshes with the first toothed wheel 90. In order to eliminate the angular play between the drums 2 and 3, two slightly offset toothed wheels 80, 81 of the shaft 8 mesh with the first toothed wheel 90.

Preferably, the drum 2 and the shaft 8 thereof consist of a single-piece metal element. Likewise, the drum 3 and the shaft 9 thereof consist of a single-piece metal element. The risks of bad positioning of the drums on the respective shafts thereof are thus eliminated.

The device comprises at least one pair of blades 20, 30, 21, 31, 22, 32, 23, 33, the blades 20, 30; 21, 31; 22, 32; 23, 33 of the pair being carried by the two drums 2,3, respectively, the blades of the pair being intended to cooperate via a shearing effect during the rotation of the drums 2, 3 in order to cut the waste.

Preferably, the device can comprise a plurality of pairs of blades 20, 30, 21, 31, 22, 32, 23,33. The blades 20, 21, 22, 23 (respectively 30, 31, 32, 33) of each drum are distributed, preferably regularly, on the circumference of the drum 2. According to the embodiment illustrated, each drum 2 (or 3) has four blades 20, 21, 22, 23 (respectively 30, 31, 32, 33), distributed every 90° around the axis of rotation of the drum A1 (respectively A2).

The blades of the or each pair have, starting from the cutting edge 4 of said blades, flat faces, called overlapping faces 5,6, that overlap with each other and face each other at least locally during the shearing between blades 20, 30; 21, 31; 22, 32; 23, 33. Such overlapping, over the distance "dr", is illustrated in detail in FIG. 4a.

Each blade is attached transversely to the drum 2;3, at an angle with respect to the axis of rotation A1;A2 of the drum 2;3 and in such a way that the plane passing through said overlapping face 5,6 of the blade forms an angle with the axis of rotation A1;A2 of the corresponding drum, in such a way as to produce progressive shearing.

As illustrated in FIG. 5, the blades 20,30 of a pair carried by the two drums 2,3 have opposite diagonal orientations. As visible in this FIG. 5, the cutting edge of the blade 20 (or 30) and the axis of rotation A1 (or A2) of the corresponding drum are thus not coplanar. As visible in FIGS. 6 and 7, seen in the radial direction passing through the blade, in particular in the middle of said blade, the blade cutting edge 20 and the axis of rotation of the corresponding drum are inclined by an angle corresponding to the first blade inclination allowing the progressive cutting to be obtained, in this case an angle of 15° and as illustrated in FIGS. 6 and 7.

Thus, the shearing begins locally at the two longitudinal ends of the blades 20,30 of the pair and moves along the blades up to the two opposite longitudinal ends, which allows the noise of cutting to be reduced quite substantially.

According to the invention, and as previously explained, said overlapping face 5;6 of each blade 20; 30; 21; 31; 22, 32; 23;33 is inclined with respect to the corresponding drum 2;3 in such a way that the plane P1;P2 passing through said overlapping face 5;6 does not intersect the axis of rotation of the drum 2; 3 over the active width L1;L2 of the drum 2;3.

Such an inclination allows greater overlapping during the shearing to be provided for the same cutting clearance, without the risk of interference between the blades.

According to one embodiment, the blades of a pair are positioned on the drum of said blades in such a way as to allow local overlapping of said overlapping faces 5,6 of the blades, during shearing, greater than 0.33% of the cutting centre-to-centre distance, for a cutting clearance of less than 0.02 mm.

It is thus possible, and contrary to the progressive cutting devices of the prior art, to provide blades having rectilinear cutting edges and not curved cutting edges as taught in particular in documents DE1117358 and FR 2 640 174.

According to one illustrated embodiment, the blades of the pair each have an active rectilinear cutting edge 4 defined at the intersection of the flat overlapping face 5 (or 6) and a flat outer face 50 (or 60), called upper face, of the blade.

According to one embodiment, the blades 20; 30; 21; 31; 22, 32; 23; 33 each have a constant cross-section longitudinally, which simplifies the manufacture of said blades. The body of the blades can have a substantially parallelepiped shape, as illustrated in the drawings.

Each blade 20; 30; 21; 31; 22, 32; 23; 33 can have at least one flat lateral face 51 (or 61) suitable for forming said overlapping face 5 (or 6) at least over a surface portion, said cutting edge 4 being defined at the intersection of the lateral face 51 (or 61) and the upper outer face 50 (or 60).

Advantageously, each blade of the pair can be a reversible blade having two mounting positions on the drum, said blade having two lateral faces 51,52; 61,62, parallel and opposite, suitable for each forming, at least over a surface portion, said overlapping face 5,5";6,6", a first rectilinear cutting edge 4 being defined at the intersection of one of the lateral faces and an upper outer face 50;60, and a second rectilinear cutting edge 4" being defined at the intersection of the other lateral face 52;62 and another lower outer face 53;63.

When the first blade cutting edge 4 is worn, it is possible to remove the blade, turn said blade over, and mount said blade in the other mounting position thereof in order to expose the second cutting edge 4".

Preferably, each blade is fastened to the drum 2 (or 3) at a housing of said drum comprising a flat bearing face 24 (or 34) for said lateral face carrying the active cutting edge, directly or via a wedge.

This flat bearing face 24 or 34 thus forms a reference plane for the positioning of the active cutting edge of the blade and the overlapping face 5 or 6 thereof.

Figure 9A:
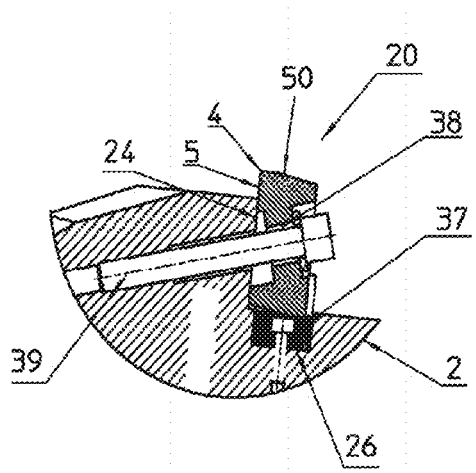
FIG. 9a and FIG. 9b are views of the cross-section C-C of FIG. 7, for a new blade and a worn blade, respectively.
Figure 9C:
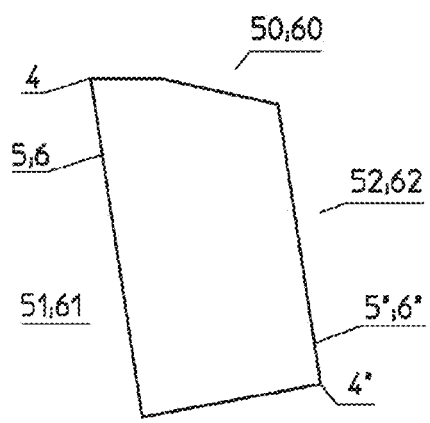
FIG. 9c is a side view of a blade.
Figure 8B:
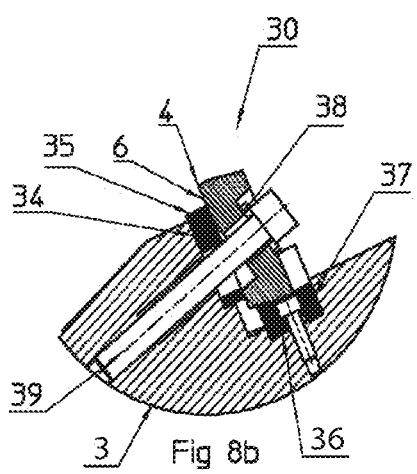
Figure 9B:
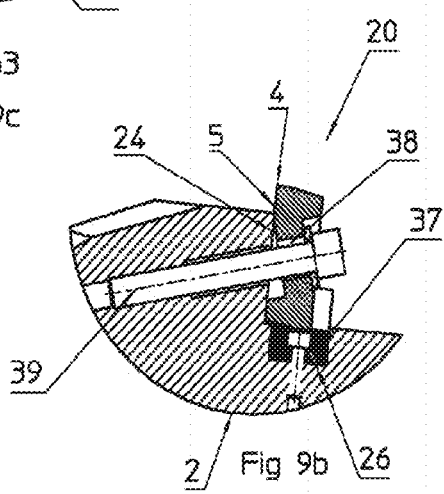
Figure 10:
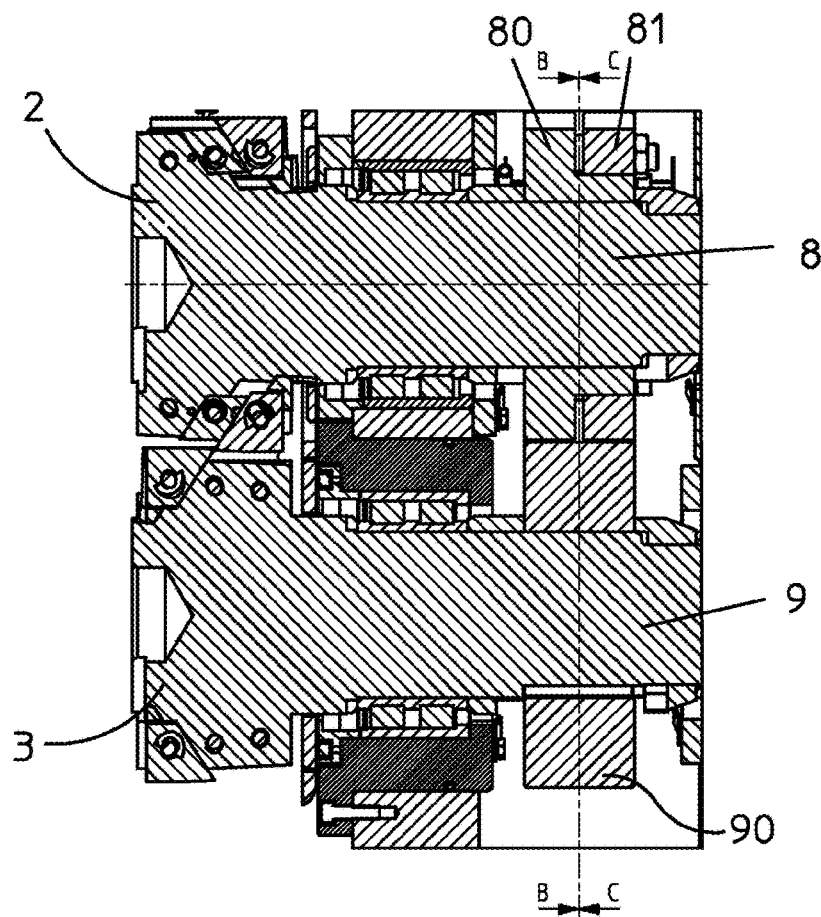
FIG. 10 is a cross-sectional view of the device of FIG. 5 along a plane passing through the two axes of rotation of the drums.
Figures 11, 12:
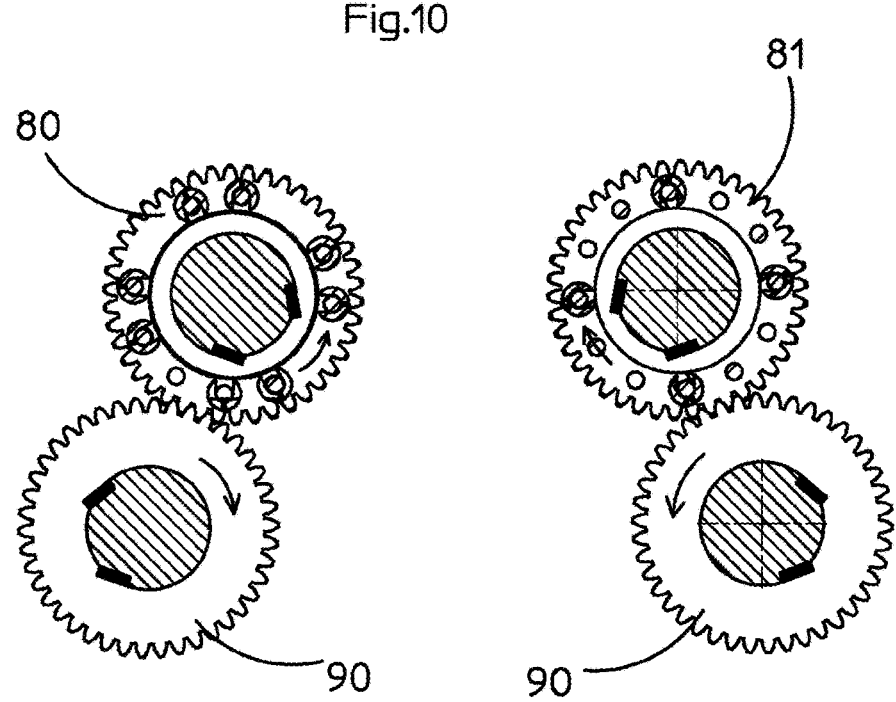
FIG. 11 and FIG. 12 are views of the cross-sections B-B and C-C, respectively, as illustrated in FIG. 10.

During the assembly, the lateral face 51 carrying the active cutting edge is pressed directly against this flat bearing face 24, as illustrated in FIGS. 9a and 9b as a non-limiting example, or via a wedge 35 having a predetermined thickness as illustrated in FIGS. 8a and 8b.

Here, active cutting edge means, in the case of a reversible blade having a plurality of cutting edges, the cutting edge (4 or 4") exposed to work in shearing, and not the passive cutting edge not used.

Such an arrangement allows the circumferential positions of the blades on the drum of said blades (2 or 3) to be definitively adjusted, without this adjustment being dependent on the wear of the blades and in particular on the reduction in thickness of said blades. Regardless of the reduction in the thickness of the blades between the lateral faces of said blades, the circumferential positions of the blades on the drum is fixed and no longer has to be modified in case of wear to the blades, contrary to the prior art taught by document FR 2 640 174.

Thus, the adjustment via the wedge 34 does not change between a new blade as illustrated in FIG. 8a and a worn blade, illustrated in FIG. 8b, which has a smaller thickness.

Likewise, the direct adjustment via the bearing face 24 does not change between a new blade as illustrated in FIG. 9a and a worn blade, illustrated in FIG. 9b, which has a smaller thickness.

The reduction in thickness between the lateral faces, caused by wear, does not have to be taken into account, and such that this will be the case if the lateral face of the opposite blade were to be pressed against the face carrying the active cutting edge of the blade, as taught by document FR 2640174. Such an assembly, although not preferred, is still possible.

Preferably, the housing comprises, besides the flat bearing face, called first bearing face 24;34, for said lateral face of said blade, a second bearing face 26;36 substantially perpendicular to the first bearing face and acting as a support for a lower outer face 53;63 of said blade, directly or preferably via a wedge 37. This wedge 37 having a predetermined thickness allows the overlap (distance dr) between the blades of the same pair to be adjusted.

Each blade has a plurality of bores 38 for screws 39 to pass through. These bores are distributed along the length of each blade, for example each bore passing from one lateral face 51 (respectively 61) to the other lateral face 52 (respectively 62) of the blade. The attachment screws cooperating with threaded bores preferably extending from the flat bearing face for said lateral face.

The rotating shafts are guided in rotation via bearings, which limits the axial play, with a motor allowing the drums to be driven in rotation.

Naturally, other embodiments could have been envisaged without going beyond the scope of the invention defined by the claims below.

NOMENCLATURE

Invention: (FIGS. 3 to 12)
1. Shearing device,
2,3. Counter-rotating drums, upper and lower,
4. Blade cutting edge (First cutting edge),
4". Blade cutting edge (Second reversible-blade cutting edge)
5,6. Overlapping faces of the blades of one pair,
5",6". Overlapping faces of the blades of one pair starting from the second cutting edge (4"),
8. Rotating shaft (drum 2),
9. Rotating shaft (drum 3),
20, 21, 22, 23. Upper drum blades,
30, 31, 32, 33. Lower drum blades,
24. Bearing face drum 2 (First bearing face),
34. Bearing face drum 3 (First bearing face),
26. Second bearing face (drum 2),
36. Second bearing face (drum 3),
35. Wedge (First bearing face),
37. Wedge (Second bearing face),
38. Bores (for screws),
39. Screws,
50. Upper outer face of the blade (labelled 20),
51,52. Lateral faces of the blade (labelled 20),
53. Lower outer face (blade labelled 20),
60. Upper outer face of the blade (labelled 30),
61,62. Lateral faces of the blade (labelled 30),
63. Lower outer face (blade labelled 30),
A1. Axis of rotation upper drum,
A2. Axis of rotation lower drum,
P1. Plane passing through the overlapping face (5),
P2. Plane passing through the overlapping face (6),
I1. Point of intersection between the plane P1 and the axis A1,
I2. Point of intersection between the plane P2 and the axis A2,
L1. Active width of the upper drum,
L2. Active width of the lower drum,
dr. Overlap between the blades of the same pair,
dc. Cutting clearance.
Prior Art: (FIGS. 1 and 2):
1'. Shearing device,
2',3'. Counter-rotating drums, upper and lower,
4'. Blade cutting edge,
5',6', Overlapping faces of the blades of one pair,
20', 21', 22', 23'. Upper drum blades,
30', 31', 32', 33'. Lower drum blades,
A1'. Axis of rotation upper drum,
A2'. Axis of rotation lower drum,
C'. Clamping wedges,
P1'. Plane passing through the overlapping face (5'),
P2'. Plane passing through the overlapping face (6'),
I1'. Point of intersection between the plane P1' and the axis A1',
I2'. Point of intersection between the plane P2' and the axis A2',
L1'. Active width of the upper drum,
L2'. Active width of the lower drum,
dr'. Overlap between blades.

The invention claimed is:

1. A shearing device (1) for fragmenting a metal strip into multiple pieces, said device comprising:
    two counter-rotating drums positioned facing each other, respective axes of rotation of the two drums being parallel to each other;
    a drive device connecting the two drums and synchronising a speed of rotation of the two drums; and
    a pair of blades, first and second blades of the pair of blades being carried by a respective drum of the two drums,
    the first and second blades of the pair of blades cooperating with a shearing effect during rotation of the two drums for cutting, the first and second blades having, starting from cutting edges (4) of the first and second blades, flat overlapping faces (5,6) that overlap with one another and face each other at least locally during shearing between the first and second blades,
    the first blade of the pair of blades being attached transversely to the respective drum at an angle with respect to an axis of rotation of the respective drum and in such a way that a plane which is co-planar with said overlapping face (5,6) of the first blade forms an angle with the axis of rotation of the respective drum, a cutting edge of the first blade and the axis of rotation of the respective drum being non-coplanar,
    the second blade of the pair of blades being attached transversely to the respective drum at an angle with respect to an axis of rotation of the respective drum and in such a way that a plane which is co-planar with said overlapping face (5,6) of the second blade forms an angle with the axis of rotation of the respective drum, a cutting edge of the second blade and the axis of rotation of the respective drum being non-coplanar,
    the first and second blades of the pair of blades carried by the two drums having opposite diagonal orientations and in such a way as to produce progressive shearing,
    wherein said overlapping face of each blade of the first and second blades has a double inclination with respect to the respective drum in such a way that the plane which is co-planar with said overlapping face does not intersect the axis of rotation of the respective drum over an active width of the respective drum, said plane intersecting the axis of rotation of the respective drum at a point located outside of a segment of the axis corresponding to the active width of the respective drum, wherein each blade of the pair of blades has a rectilinear cutting edge defined at an intersection of the overlapping face and an outer face of the blade, wherein said double inclination of the first blade prevents the rectilinear cutting edge of the first blade from impacting the second blade during shear cutting, wherein said double inclination of the second blade prevents the rectilinear cutting edge of the second blade from impacting the first blade during shear cutting, and wherein said double inclination is determined with respect to the rectilinear cutting edge of each blade parallel to the axis of rotation of the respective drum as follows:

a first inclination of the overlapping face is obtained by rotation of each blade about an axis of rotation which is contained in a plane coplanar with the overlapping face, radial and perpendicular to the axis of rotation of the respective drum, and in such a way as to obtain the progressive shearing, the rotation ranging from 10° to 20°, and a second inclination is obtained by rotation of each blade about an axis of rotation which is contained in a plane coplanar with the overlapping face and is parallel to the cutting edge of the blade, the rotation ranging from 4.5° to 14.5°.

2. The device according to claim 1, wherein said drive device connecting the drums and synchronising the speed of rotation of said drums comprises two rotating shafts rigidly connected to the two drums, respectively, and a gear system connecting the two shafts, comprising a first toothed wheel and at least one second toothed wheel.

3. The device according to claim 2, wherein each drum and rotating shaft (8;9) thereof consist of a single-piece metal element.

4. The device according to claim 1, wherein the blades of the pair of blades are positioned on the drums in such a way as to allow local overlapping of said overlapping faces of the blades, during shearing, greater than 0.33% of the cutting centre-to-centre distance over the entire length of the cutting edge, for a cutting clearance of less than 0.02 mm.

5. The device according to claim 1, wherein each blade of the pair of blades have a constant cross-section longitudinally.

6. The device according to claim 5, wherein each blade of the pair of blades has at least one flat lateral face for forming said overlapping face at least over a surface portion, said cutting edge being defined at the intersection of the lateral face and the upper outer face.

7. The device according to claim 1, wherein each blade of the pair of blades has at least one flat lateral face forming said overlapping face at least over a surface portion, said cutting edge being defined at the intersection of the lateral face and the outer face.

8. The device according to claim 7, wherein each blade of the pair of blades is fastened to the respective drum at a housing of said respective drum comprising a flat first bearing face for said lateral face carrying the active cutting edge, directly or via a wedge.

9. The device according to claim 8, wherein the housing further comprises a second bearing face perpendicular to the first bearing face and acting as a support for a lower outer face of said blade, directly or via a wedge (37).

10. The device according to claim 9, wherein each blade of the pair of blades has a plurality of bores for screws to pass through, threaded bores extending from the flat first bearing face.

11. The device according to claim 7, wherein each blade of the pair of blades is a reversible blade having two mounting positions on the drums, said blade having two flat, parallel and opposite lateral faces to form, at least over a surface portion, said overlapping face, a first rectilinear cutting edge being defined at the intersection of one of the lateral faces and an upper outer face, and a second rectilinear cutting edge being defined at the intersection of the other lateral face and another lower outer face.

12. The device according to claim 11, wherein each blade of the pair of blades is fastened to the drum at a housing of said drum comprising a flat bearing face for said lateral face carrying the active cutting edge, directly or via a wedge.

13. A method to fragment metal strips into multiple pieces, comprising:

providing the shearing device of claim 1; and feeding one or more metal strips into the shearing device.

14. The method according to claim 13, wherein the one or more metal strips have a thickness of less than 1 mm.

15. The method according to claim 13, wherein the one or more metal strips are made of a material having an elongation coefficient greater than 20%.

* * * * *